United States Patent Office 3,074,864
Patented Jan. 22, 1963

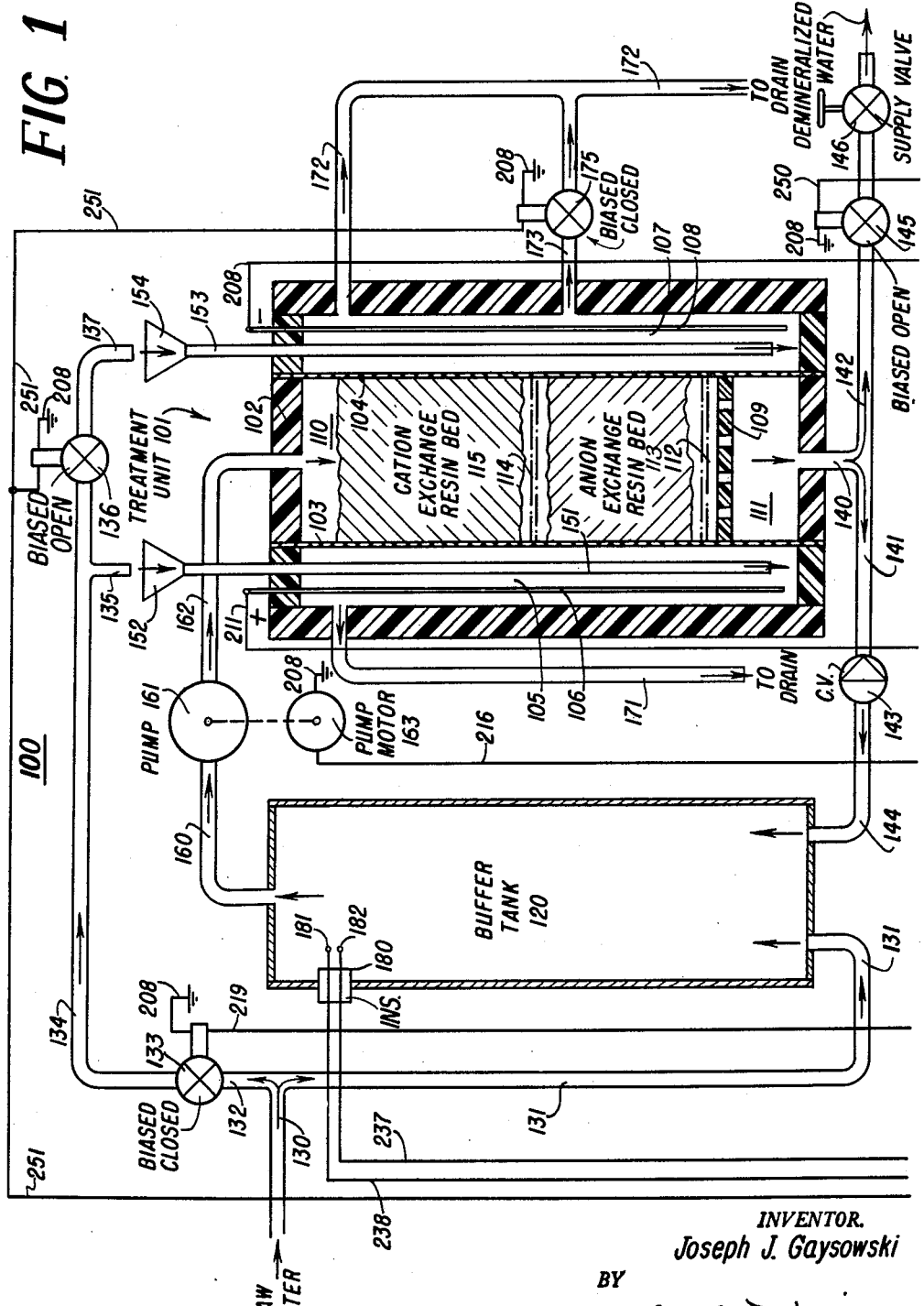

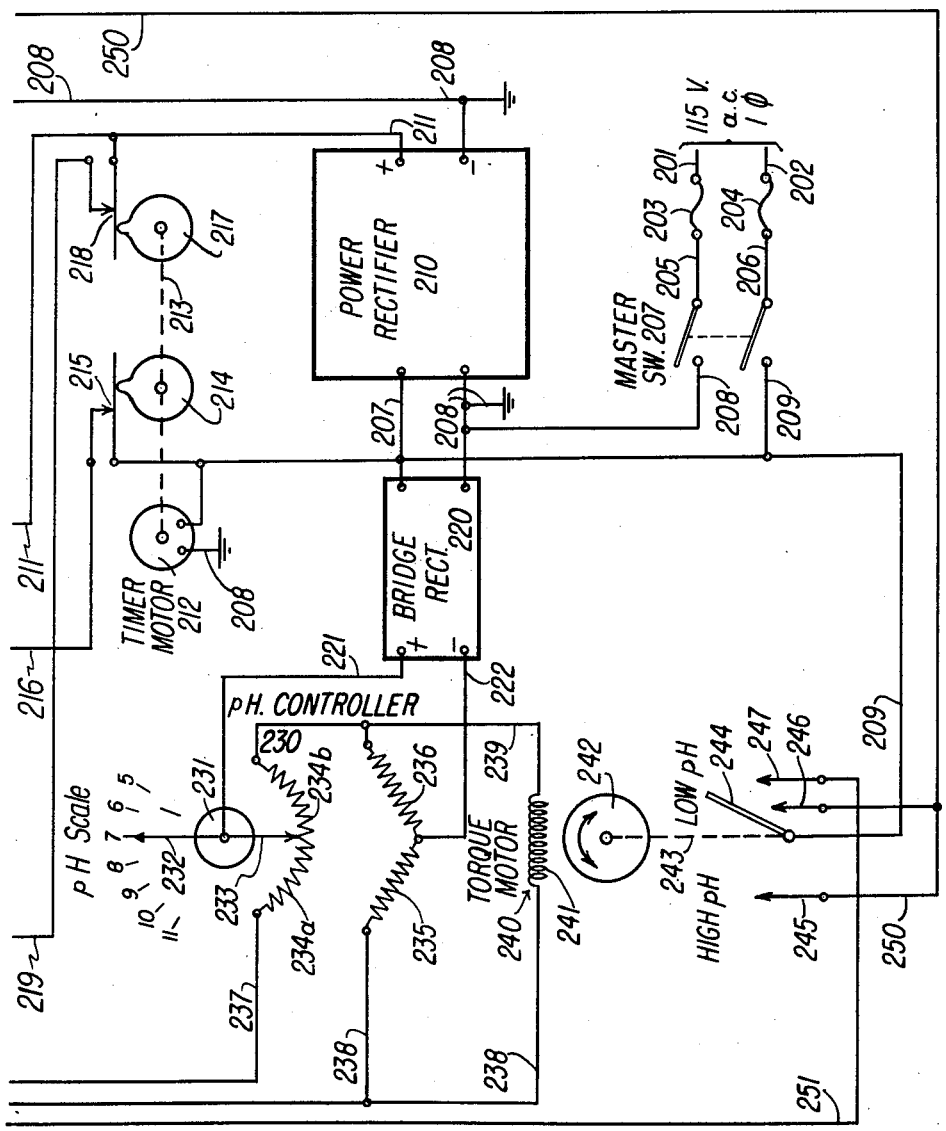

3,074,864
METHODS OF AND APPARATUS FOR DE-
MINERALIZING RAW WATER
Joseph J. Gaysowski, Chicago, Ill., assignor to General
Electric Company, a corporation of New York
Filed Apr. 21, 1959, Ser. No. 807,895
14 Claims. (Cl. 204—151)

The present invention relates to water demineralizing methods and apparatus, and particularly to such methods and apparatus employing a water treatment unit containing both cation exchange resin and anion exchange resin, the water treatment unit involving both ion exchange and electrodialysis.

It is a general object of the invention to provide an improved method and apparatus of the character noted, employing a water treatment unit having therein both a cation exchange resin and an anion exchange resin, the water treatment unit containing structure to pass a direct current through the resins to regenerate the resins by means of electrodialysis, and an arrangement for substantially matching the regenerating rates of the two beds, so that following a draw-off of demineralized water from the system, substantially equal recovery or regeneration of the two resins takes place during a given recovery time interval.

Another object of the invention is to provide in a method and apparatus of the character noted, an improved circulating system involving a buffer tank so as to limit the degeneration of the cation exchange resin and the anion exchange resin incorporated in the system incident to a draw-off of demineralized water therefrom, so that the recovery time interval of the two resins is reduced to a substantial minimum.

A further object of the invention is to provide in a method and apparatus of the character noted, an improved arrangement for passing the regenerating current through the exchange resin beds, whereby the electrical conditions can be selectively varied in a ready manner so as selectively to establish the desired regenerating rates of the two resins.

Another object of the invention is to provide in a method and apparatus of the character noted, an improved arrangement of applying the regenerating current to the resins so that the rates of regeneration thereof are substantially matched, with the result that the regeneration states of the two resins are always substantially equal in order to avoid relatively low pH water or relatively high pH water in the demineralized water outlet.

A still further object of the invention is to provide in a method and apparatus of the character noted, an improved arrangement for regenerating the ion exchange resins, wherein they have substantially equal total ion exchange capacities in total grains of dissolved solids that can be extracted from raw water between regenerations of the beds.

A further object of the invention is to provide in a method and apparatus of the character noted an arrangement for selectively changing the impedance, more particularly the resistance, for the regenerating current through the resins in response to changes in the pH of the demineralized water.

In connection with the foregoing object it is another object of the invention to provide in a method and system of the character noted, apparatus to prevent withdrawal of water from the apparatus when the pH of the water is not within a predetermined range of pH.

Further features of the invention pertain to the particular arrangements of the steps of the methods and of the elements of the apparatus, whereby the above-outlined and additional operating features thereof are attained.

The invention, both as to its organization and method of operation, together with further objects and advantages thereof, will best be understood by reference to the following specification taken in connection with the accompanying drawings in which:

FIGURE 1 is a diagrammatic illustration of a water demineralizing apparatus embodying the present invention, and in which the method of the present invention is carried out; and FIG. 2 is a schematic electrical diagram of the control apparatus and circuits for controlling the operation of the water demineralizing apparatus of FIG. 1.

At the outset, it is noted that the present invention is predicated upon the discovery that the performance characteristics of the water demineralizing system embodying electrodemineralizing apparatus involving both ion exchange and electrodialysis can be drastically improved by controlling the impedance, and specifically the resistance, through the cation exchange resin bed and the anion exchange resin bed, so that the recovery or regenerating rates of the two beds can be selectively varied to obtain a substantial match therebetween. This improved method and apparatus takes advantage of the peculiar recovery characteristics of the cation exchange bed and the anion exchange bed respectively incorporated in the apparatus. More particularly, in two comparable such resin beds having approximately the same ion exchange capacities and at substantially the same state of generation, it will be observed that the cation exchange resin bed has a relatively low specific resistance and the anion exchange resin bed has a relatively high specific resistance, the ratio between the two specific resistances mentioned being about 1:2. Accordingly, following unit degeneration of the two resin beds and with the same direct voltage applied between the anodes and the cathodes associated with the beds, the regenerating current through the cation exchange bed is about three times that through the anion exchange bed, whereby to pass the required coulombs to effect substantially equal regenerations of the two resin beds, whereby approximately one unit of time is required for regeneration of the cation exchange bed and approximately three units of time are required for regeneration of the anion exchange bed. Moreover, these time intervals become further disproportional in the event of the degeneration of the beds in excess of one unit, due to the normal recovery rates of the beds; whereby the state of generation of the cation resin bed frequently becomes substantially higher than that of the anion resin bed, in the event of an excess draw-off of demineralized water from the system, with the result that in the subsequent draw-off "acid water" is obtained, as the cation exchange resin bed is far more effective that the anion exchange resin bed.

Now it has been discovered that the time interval required to effect the complete regeneration of the cation exchange bed may be substantially matched to the time interval required to effect the complete regeneration of the anion exchange bed by applying the same direct voltage to the beds and selectively varying the relative impedances and particularly the resistances thereof.

In an illustrative embodiment of the system, the two recovery or regenerating rates can be substantially matched by increasing the resistance through the cation exchange resin bed whereby to increase the average or overall resistance thereof to a value substantially equal to that of the anion exchange resin bed. Hence, in accordance with the method and apparatus of the present invention, the regeneration rates of the two beds substantially match each other at all times so that the states of generation thereof are substantially matched with each other at all times, so as to avoid low pH water and high pH water in the outlet of the demineralizing apparatus.

Referring now to FIGS. 1 and 2 of the drawings, the demineralizing system 100 there illustrated, and embodying the features of the present invention and in which the method of the present invention is carried out, is especially designed for home use, and essentially comprises a treatment unit 101, a buffer tank 120, a raw water supply pipe 130, and a demineralized or treated water supply pipe 140. The raw water in the raw water supply pipe 130 is under pressure and is connected to the city water main, not shown; while the demineralized water supply pipe 140 is normally connected through a supply valve 146 to the water heater, not shown, in the home. The raw water in the supply pipe 130 contains substantial dissolved mineral salts supplying thereto such cations as: $Ca^{++}$, $Mg^{++}$, $Fe^{++}$, $Na^+$, $K^+$, etc., and such anions as: $HCO_3^-$, $SO_4^{--}$, $Cl^-$, $CO_3^{--}$, etc. Moreover, this raw water may be quite hard and may have a total dissolved solids content as high as about 70 grains per gallon (1200 p.p.m.). In the operation of the treatment unit 101, the raw water is demineralized, whereby the demineralized or treated water delivered to the supply pipe 140 has a total dissolved solids content not in excess of three grains per gallon (51 p.p.m.).

Fundamentally, the treatment unit 101 comprises an outer shell 102, a pair of permeable diaphragms 103 and 104 arranged within the outer shell 102 and cooperating therewith to define an anolyte chamber 105 having a rod-like anode 106 therein and a catholyte chamber 107 having a rod-like cathode 108 therein. The elements 102, 103 and 104 are arranged in an upstanding position, the diaphragms 103 and 104 defining therebetween a treatment chamber which is provided with a transverse apertured plate 109 dividing the area into an upper resin containing chamber 110 and a lower treated water collecting chamber 111. Disposed upon the apertured plate 109 is a porous mass of glass fibers 112 supporting thereon a porous ion exchange bed 113 (preferably a synthetic organic polymeric anion exchange resin) accommodating the ready passage therethrough of the water undergoing treatment. Disposed on top of the bed 113 is a second mass of loosely packed glass fibers 114 upon which rests the cation exchange resin bed 115 which accommodates the ready passage therethrough of the water undergoing treatment and essentially comprises a loosely packed mass of cation exchange material (preferably a synthetic organic polymeric cation exchange resin). The two beds 113 and 115 are so related that they have substantially equal cation and anion exchange capacities in total grains of dissolved solids that may be removed from the water undergoing treatment.

More particularly, this anion exchange resin is of bead-like formation and may comprise the strong-base resin sold under the names "Amberlite IRA-400" and "Amberlite IRA-410"; and this cation exchange resin is of bead-like formation and may comprise the strong-acid resin sold under the name "Amberlite IR-120." An anion exchange resin of the type specified essentially comprises a stable insoluble synthetic organic polymer, active basic functional groups chemically bonded thereto and dissociable into free mobile anions to impart a positive charge to the polymer, and water in gel relationship with the polymer. Similarly, a cation exchange resin of the type specified essentially comprises a stable insoluble synthetic organic polymer, active acidic functional groups chemically bonded thereto and dissociable into free mobile cations to impart a negative charge to the polymer, and water in gel relationship with the polymer. The active basic functional groups attached to the associated organic polymer are oriented with respect to the interfaces thereof so as to be partially or completely dissociable in the internal gel water into fixed positive ions linked to the polymer and into mobile exchangeable negative ions, and similarly, the active acidic functional groups attached to the associated organic polymer are oriented with respect to the interfaces thereof so as to be partially or completely dissociable in the internal gel water into fixed negative ions linked to the polymer and into mobile exchangeable positive ions.

Typical such polymers to which active basic functional groups may be attached include: urea-formaldehyde resins, melamine-formaldehyde resins, polkalkylene-polyamine-formaldehyde resins, and the like; and such suitable active basic functional groups include: quaternary ammonium hydroxides, amino groups, the guanidyl group, the dicyanodiamidine group, and like organic nitrogen-containing basic groups; the quaternary ammonium hydroxide groups, the guanidyl and dicyanodiamidine groups being usually preferred because of their high dissociation constants. Typical such polymers to which active acidic functional groups may be attached include: phenol-aldehyde resins, polystyrene-divinylbenzene copolymers, and the like; and such suitable active acidic functional groups include: $-SO_3H$, $-COOH$, and the like; $-SO_3H$ being usually preferred because of its high dissociation constant. Normally the water in gel relationship with the polymer should be present in an amount of at least 15% of the weight of the dry resin.

The buffer tank 120 may be formed of steel; and raw water to be treated is supplied to the bottom of the buffer tank 120 from the raw water supply pipe 130 through a connecting pipe 131. Raw water is also supplied to flush the anolyte and catholyte chambers from the supply pipe 130 through a connecting pipe or conduit 132. A normally closed electromagnetically operated solenoid valve 133 is disposed in the conduit 132 and in turn connects to a pipe 134. An outlet pipe 135 for the anolyte chamber 105 is provided communicating with the pipe 134. A valve 136 is provided in the pipe 134 beyond the outlet pipe 135 and connecting with an outlet pipe 137 for the catholyte chamber 107. The valve 136 is normally open and is of the type which is controlled electromagnetically. The outlet pipe 140 connecting with the lower portion of the chamber 111 is connected to a first pipe 141 which conveys treated water to the buffer tank 120 and to a second pipe 142 which conducts treated and demineralized water to the point of use. A check valve 143 has the input connection thereof attached to the pipe 141 and a pipe 144 connects the outlet of the valve 143 to the bottom of the buffer tank 120, the check valve 143 being arranged so that treated water can flow only to the left through the pipe 141 from the treatment unit 101 into the buffer tank 120, the check valve 143 closing and preventing reverse flow from the buffer tank 120 into the pipes 140, 141 and 142. The delivery pipe 142 has a solenoid operated valve 145 therein which is normally biased open and a supply valve 146 therein which is preferably manually operated.

The upper portion of the buffer tank 120 is connected by a pipe 160 to the inlet of a circulating pump 161, the outlet of the pump 161 communicating with a pipe 162, which pipe 162 in turn communicates with the upper portion of the treatment unit 101 and particularly with the upper portion of the treatment chamber 110 thereof. The pump 161 is suitably driven by an electric motor 163 drivingly connected thereto. Accordingly, it will be understood that the raw water to be demineralized is supplied from the pipe 130 via the pipe 131 into the lower portion of the buffer tank 120. The water is circulated through the buffer tank 120 and thence flows via the pipe 160 under the action of the pump 161 and via the pipe 162 into the upper portion of the treatment chamber 110 and through the porous resin beds 113 and 115 and thence into the collecting chamber 111. The treated water further flows from the collecting chamber 111 through the pipe 140 via the check valve 143 and the pipe 144 into the lower portion of the buffer tank 120. If there is a demand for treated water, the water may also flow from the collecting chamber 111 via the pipes 140 and 142 and the valves 145 and 146 to the point of use. In the circulation of the water as described above, it is demineralized; whereby the demineralized water is accumulated in the buffer tank 120 and the treatment unit 101 for dispensing through the outlet pipe 142 as required.

The lower portion of the anolyte chamber 105 communicates with an upstanding conduit 151 extending upwardly through the anolyte chamber 105 and to the exterior of the outer shell 102 and is provided on the upper end thereof with a funnel 152 for the delivery of anolyte into the anolyte chamber 105 from the outlet pipe 135. Similarly, the lower portion of the catholyte chamber 107 communicates with an upstanding conduit 153 which extends through the upper portion of the outer shell 102 and is provided at the upper end thereof with a funnel 154 for the delivery of catholyte into the catholyte chamber 107. Accordingly, raw water can be fed from the supply pipe 130 through the pipe 132 under the control of the solenoid valve 133 and via the pipes 134, 135 and 137 into the funnels 152 and 154 to supply new anolyte and catholyte to the anolyte chamber 105 and the catholyte chamber 107, respectively. Furthermore, supply of new catholyte to the catholyte chamber 107 can be additionally controlled by the solenoid valve 136. Upon the addition of new anolyte to the anolyte chamber 105, the excess anolyte flows therefrom through a pipe 171 communicating with the upper portion of the anolyte chamber 105. A similar overflow pipe 172 is provided for the catholyte chamber 107 and communicates with the upper portion thereof. A second outlet is also provided for the catholyte chamber 107 at substantially the vertical midpoint thereof in the form of a pipe 173 which connects with the pipe 172 through a normally closed solenoid valve 175. The pipes 171 and 172 serve to regulate the maximum amount of anolyte and catholyte present in the anolyte chamber 105 and the catholyte chamber 107, respectively. In addition the level in the catholyte chamber 107 can be maintained at approximately half the usual height by opening the valve 175 and permitting the level of catholyte in the chamber 107 to fall to the level of the pipe 173.

Further, the system 100 comprises a source of electric power of 115 volts, A.-C., single-phase, including two conductors 201 and 202 respectively connected through fuses 203 and 204 and conductors 205 and 206 to a master switch 207. The master switch 207 when closed further connects the conductors 201 and 202 to conductors 208 and 209 respectively connected to the input terminals of an associated power rectifier 210, the conductor 208 being connected to ground potential. The output terminals of the rectifier 210 are connected to two conductors 208 and 211 which are connected to the cathode 108 and to the anode 106, respectively, to apply the desired operating potentials thereto.

The system 100 further comprises a timer motor 212 of the synchronous type and bridged across the conductors 208 and 209. Preferably, the timer motor 212 is of the "Telechron" type and comprises a shaft 213 having a first switch actuating cam 214 driven thereby for controlling the opening and closing of a switch 215. The switch 215 is biased open and when closed by the cam 214 connects the conductor 209 to a conductor 216 whereby to apply electrical energy to the pump motor 153 which has the other input terminal thereof grounded through the conductor 208. Also driven by the timer motor shaft 213 is a second switch actuating cam 217 controlling a normally biased open switch 218. When the cam 217 is in position to close the switch 218, the switch connects the rectified power line 211 to a line 219 connected to one of the input terminals of the solenoid valve 133. The other terminal of the solenoid valve 133 is grounded through the conductor 208.

In view of the foregoing, it will be understood that in the operation of the apparatus 100, the timer motor 212 periodically closes and later opens the switch 215, whereby the electric drive motor 153 is correspondingly periodically operated to effect corresponding operation of the pump 161, with the result that the water undergoing treatment is circulated from the treatment chamber 110 of the treatment unit 101 and through the buffer tank 120 and then back to the treatment chamber 110; whereby the circulated water is demineralized as previously noted. Also, in the operation of the apparatus 100, the timer motor 212 periodically closes and later opens the switch 218, whereby the solenoid of the valve 133 is correspondingly energized and later de-energized periodically. When the solenoid of the valve 133 is thus energized, the valve 133 is operated from its closed position into its open position so as to supply water through the pipe 134 to be used as fresh anolyte from the pipe 135 via the funnel 152 and the conduit 151; and further when the valve 136 is opened water is supplied as fresh catholyte from the pipe 134 via the pipe 137 into the funnel 154 and the conduit 153 and thus into the catholyte chamber 107. When fresh anolyte is thus supplied into the anolyte chamber 105, the anolyte therein is displaced therefrom and flows via the pipe 171 to the drain (not shown); and likewise, when fresh catholyte is thus supplied into the catholyte chamber 107, the catholyte therein is displaced therefrom and flows via either the pipe 172 or the pipe 173 to the drain, depending upon whether the valve 175 is open or closed.

The conductors 208 and 209 are also connected to the input terminals of a bridge rectifier 220 and the output from the bridge rectifier 220 on the output terminals thereof is a rectified D.-C. voltage, a conductor 221 being connected to the positive output terminal of the rectifier 220 and a conductor 222 being connected to the negative output terminal of the rectifier 220. The conductors 221 and 222 provide the operating potential for a pH controller 230 which is operative in response to changes in the pH within the buffer tank 120 to change the operation of the treatment unit 101 whereby to maintain the pH within the buffer tank 120 within a predetermined range. The pH controller 230 comprises a Wheatstone bridge circuit which includes therein a manually adjustable control member 231 provided with the usual knob and having a pointer 232 cooperating with a pH scale. Mechanically connected to the pointer 232 is a wiper 233 which makes electrical contact with a resistor 234 having two segments 234a and 234b, the resistances in the segments 234a and 234b being adjustable and the absolute values thereof depending on the position of the wiper 233 in contact therewith. The resistance 234b forms one leg of the Wheatstone bridge circuit, a resistor 235 forms another leg of the bridge and a resistor 236 forms yet another leg of the bridge. The fourth leg of the bridge is formed by the resistance segment 234a connected by conductors 237 and 238 in series with the resistance between a pair of probes 181 and 182 disposed in the buffer tank 120 and mounted in the wall thereof by an insulator 180, the conductor 237 being connected to the probe 182 and the conductor 238 being connected to the probe 181.

The conductor 221 is connected to the wiper 233 and, accordingly, the point of contact of the wiper 233 with the resistor 234 is one of the input terminals of the Wheatstone bridge; similarly, the conductor 222 is connected to the junction of the resistors 235 and 236 and therefore this junction forms a second input terminal for the bridge. The output from the bridge is taken from a conductor 239 which connects one end of the resistance 234b to one end of the resistor 236 and further connects this junction to one terminal of a torque motor 240. The other output terminal for the bridge is at the junction between one end of the resistor 235 and the probe 181, this junction being formed by the line 238 and being connected by the line 238 to the other input terminal for the torque motor 240. The torque motor 240 more particularly comprises a field coil 241 having the ends thereof connected to the conductors 238 and 239 and a rotor 242 having a mechanical connection 243 to a movable contact arm 244. The contact arm 244 is adapted under the control of the torque motor 240 to be moved selectively to the left or counterclockwise and against the contact 245 when the pH within the buffer tank 120 is too high; and, alternatively, when the pH within the buffer tank 120 is too low the arm 244 is moved under the control of the torque motor 240 to the right or clockwise and against the contacts 246 and 247 to make simultaneous connection therewith. The contact arm 244 is in electrical connection with the conductor 209 and therefore movement of the contact arm 244 in the counterclockwise direction and against the contact 245 applies the line voltage to the conductor 250 that is connected to the contact 245. Similarly, movement of the contact arm 244 in a clockwise direction and against the contact 246 applies the voltage on the line 209 to the conductor 250, this latter movement of the contact arm 244 also placing it against the contact 247 whereby to apply the line voltage on the conductor 209 to the conductor 251. The conductor 250 is connected to one terminal of the solenoid of the normally open valve 145, the other terminal of the solenoid being connected through the conductor 208 to ground and, accordingly, movement of the contact arm 244 against either the contact 245 or 246 serves to energize the solenoid of the valve 145 thereby to close the valve 145 and thus prevent withdrawal of water from the treatment unit 101. The conductor 251 is connected to one terminal of the solenoid of the normally open valve 136 and one of the input terminals of the solenoid of the normally closed valve 175, the other terminal of each of the solenoids being connected through the conductor 208 to ground potential. Therefore when the contact arm 244 is moved against the contact 247, operating potential is applied through the conductor 251 to the solenoids of the valves 136 and 175 whereby to energize the solenoids thereof and to move the valves to the other position. More particularly, the valve 136 is moved from the open position to the closed position whereby to prevent addition of new catholyte through the pipe 137 to the catholyte chamber 107. Simultaneously, the normally closed valve 175 is opened whereby to lower the level of the catholyte from a point substantially in alignment with the input to the pipe 172 to a point substantially in alignment with the input to the pipe 173, the excess catholyte being discharged through the pipe 173, the control valve 175 and the lower portion of the pipe 172 to the drain.

The probes 181 and 182 are operative to sense the pH of the water within the buffer tank 120 and the resistance therebetween changes in an amount proportional to the changes in pH of the water within the buffer tank 120, the change in resistance between the probes 181 and 182 being communicated to the bridge circuit of the pH controller 230. Assuming that the bridge of the controller 230 is balanced initially and that the arm 244 is midway between the contacts 245 and 246, any change in the pH of the water in the buffer tank 120 and therefore any change in the resistance between the probes 181 and 182 will unbalance the bridge and cause the arm 244 to move toward either contact 245 or 246 depending upon the direction of change of the pH. Assuming that the pH falls, the resistance between the probes 181 and 182 increases thereby unbalancing the bridge and causing current flow through the conductors 238 and 239. This will cause the current to flow through the motor winding 241 and turn the rotor 242 in a clockwise direction. If the change in pH within the buffer tank 120 is sufficient, the rotor 242 will move sufficiently to place the contact arm 244 against the contacts 246 and 247. This will immediately close the valve 145 by applying potential from the conductor 209 to the conductor 250 and thus prevent withdrawal of water having an undesirably low pH from the treatment unit 101. Simultaneously, the potential on the line 209 will be applied through the contact 247 to the line 251 thereby closing the valve 136 and opening the valve 175. Closure of the valve 136 serves to prevent the addition of catholyte to the catholyte chamber 107 and the opening of the valve 175 reduces the level of the catholyte to a point such that substantially no catholyte is in contact with the cation exchange resin bed 115. As a result the resistance through the cation exchange resin bed 115 will be substantially increased since the current path between the anode 106 and the cathode 107 must be in essence between the body of anolyte in the chamber 105 and the body of catholyte in the chamber 107, the anion exchange resin in the bed 113 lying completely in the path, whereas only a portion of the cation exchange resin in the bed 115 lies within the path. The valve 136 being closed, there will be no addition of new catholyte to the chamber 107 and, accordingly, the cation concentration therein will be held substantially constant whereby to keep the specific resistance therethrough substantially constant, whereby the rate of regeneration of the anion exchange bed 113 is held at least at the predetermined value thereof. It further is contemplated that in certain instances some additional cations will be attracted into the catholyte chamber 107 whereby to raise the ion concentration therein thus lowering the specific resistance thereof and actually increasing the regeneration rate of the anion exchange resin bed 113 by a small amount. Consequently the anion exchange resin will be regenerated at an accelerated rate with respect to the rate of regeneration of the cation exchange resin and therefore more effective removal of anions compared to the removal of cations will be obtained when the raw water is passed through the treatment unit 101.

Subsequent operation of the pump 161 to circulate the water through the treatment chamber 110 will therefore tend to remove substantially more anions than cations from the circulating water, this action replacing the anions with hydroxide ions and thus raising the pH of the recirculating water. When the recirculating and demineralized water has a pH acceptable for use, the change in pH will be communicated by the probes 181 and 182 to the bridge of the pH controller 230 whereby to unbalance the bridge in a direction opposite to the original unbalance. This will cause movement of the torque motor 240 in a counterclockwise direction thereby moving the contact arm 244 away from the contacts 246 and 247. As a result the operating potentials will be removed from the solenoids of the valves 136 and 175 thereby permitting these valves to move to their normal positions, the valve 136 moving to the open position whereby to admit new catholyte to the catholyte chamber 107 upon the subsequent opening of the valves 133 in accordance with the operation of the timer motor 212, the valve 175 moving to the closed position thereby permitting the level of the catholyte to rise within the chamber 107 to the level of the input to the pipe 172 and thus to cover and form contact with the cation exchange resin bed 115.

If the pH in the buffer tank 120 rises, the bridge of the pH controller 230 will be unbalanced in a direction to cause the torque motor 240 to operate to turn the rotor 242 in a counterclockwise direction. A sufficient rise in the pH of the water will move the contact arm 244 against the contact 245 thus applying an operating potential through the conductor 250 to the solenoid of the valve 145 whereby to energize the solenoid and to move the valve 145 from the open position to the closed position thereof. This will prevent withdrawal of water having an undesirably high pH from the water treatment unit 101 until the pH thereof has been decreased to a usable value. Since the cation exchange resin normally will be regenerated at a substantially faster rate than the anion exchange resin, continued operation of the unit under the control of the timer motor 212 will soon reduce the pH of the water due to the more effective removal of cations from the water by the cation exchange resin bed 115, the cations being replaced by hydrogen ions from the resin thereby to lower the pH and eventually to restore the pH to a usable value. When the pH has been reduced to a usable value, the unbalance of the bridge of the pH controller 230 will be such as to cause operation of the motor 240 to rotate the rotor 242 in a clockwise direction thereby moving the contact arm 244 away from the contact 245. This will remove the operating potential from the line 250 whereby to de-energize the solenoid of the valve 145 and to permit the valve to return from the closed position to the normally open position thereof, thus permitting demineralized water to be withdrawn from the treatment unit 101.

The pH controller 230 is adjustable to permit control of and selection of the desired operating range of pH of the treatment unit 101. More specifically, the bridge circuit of the controller 230 is constructed so that the pointer 231 designates on the associated scale the average or median pH in the operating range of pH of the water within the buffer tank 120 permitted by the bridge circuit thereof. As illustrated in the drawing, the pointer 232 has been set on pH 7 whereby the operation of the apparatus 100 will be such that the pH of the water within the buffer tank 120 will vary within a range having pH 7 as the median or central point thereof. If desired some other range varying, for example, around pH 8 as a median value might be selected by moving the indicator 232 along the associated scale to the mark designated "8." Such movement of the indicator 232 will also mechanically move the wiper 233 along the resistor 245 whereby to place a greater proportion of the resistance thereof in series with the resistance between the probes 181 and 182 and a lesser resistance in the leg of the bridge between the wiper 233 and the conductor 239. A new balance point is therefore provided for the bridge circuit and the contact arm 244 will be positioned substantially midway between the contacts 245 and 246 when the pH of the water within the buffer tank 120 is at pH 8. Changes in the pH of the water within the buffer tank 120 will unbalance the bridge as has been explained above whereby to move the parts to a condition tending to correct the pH of the water until the pH thereof is within an acceptable range about pH 8 as a median value.

In view of the foregoing, it will be understood that in the operation of the system 100, the timer motor 212 periodically closes and later opens the switch 215, whereby the electric drive motor 153 is correspondingly periodically operated to effect corresponding operation of the pump 161 with the result that the water undergoing treatment is circulated from the treatment chamber 110 of the treatment unit 101 and through the buffer tank 120 and thus back to the treatment chamber 110; whereby the circulated water is demineralized as previously noted. Also, in the operation of the system 100, the timer motor 212 periodically closes and later opens the switch 218, whereby the solenoid of the valve 133 is correspondingly energized and later deenergized periodically. When the solenoid of the valve 133 is thus energized, the valve 133 is operated from its closed position into its open position so as to supply water as fresh anolyte from the conduit 132 via the conduits 134 and 135 into the funnel 152 and thus into the anolyte chamber 105 of the treatment unit 101. If the valve 136 is open or in the normal position thereof, fresh catholyte is also provided upon the opening of the solenoid valve 133 from the conduit 132 via the conduits 134 and 137 into the funnel 154 and thus into the catholyte chamber 107 of the treatment unit 101. When fresh anolyte is supplied to the anolyte chamber 105, the anolyte therein is displaced therefrom and flows via the conduit 171 to the drain; and likewise, when fresh catholyte is supplied to the catholyte chamber 107, the catholyte therein is displaced therefrom and flows via the conduit 172 to the drain.

If the supply valve 146 in the supply pipe 142 is open, and further provided that the solenoid valve 145 is also open, the demineralized water flows therefrom, while raw water from the supply pipe 130 is supplied via the conduit 131 into the bottom of the buffer tank 120 and forces the previously demineralized water therefrom through the treatment unit 101 and into the supply pipe 142. In the arrangement, when demineralized water is drawn-off from the supply pipe 142, raw water is supplied to the bottom of the buffer tank 120 and mixes with the previously demineralized water therein so that a substantial dilution of the raw water takes place; and thereafter the mixed water is pumped in the local loop circuit from the buffer tank 120 through the ion exchange beds 115 and 113 and back to the buffer tank 120 so as to effect demineralization of the mixed water and the corresponding degeneration of the ion exchange beds 113 and 115. After the draw-off from the system, and as time proceeds, the beds 113 and 115 are regenerated by virtue of the application of the potential between the anode 106 and the cathode 108. Specifically, the beds 113 and 115 are regenerated with the exchange of the sorbed anions and cations of the mineral salts for hydroxyl ions and hydrogen ions and with the migration of the cations of the mineral salts through the diaphragm 104 into the catholyte contained in the catholyte chamber 107 and with the migration of the anions of the mineral salts through the diaphragm 103 into the anolyte contained in the anolyte chamber 105. The cations and the anions are subsequently flushed along with the catholyte and anolyte from the respective chambers 107 and 105 and are ultimately carried into the drain.

In the system 100 the conduits 140, 141, 142 and 162, or at least appropriate sections thereof, are formed of insulating material in order to minimize stray electric currents therebetween by virtue of the fact that the voltage with respect to ground potential in the upper portion of the treatment unit 101 may be essentially different from that in the bottom of the treatment unit 101.

In a constructional example of the treatment unit 101, the anion exchange resin bed 113 and the cation exchange resin bed 115 will have equal volumes and will contain equal volumes of resin and may for example contain one cubic foot of the appropriate resin. Moreover, in the system 100, the water pressure in the treatment unit 101 should not be in excess of 45 p.s.i. When the resin beds 113 and 115 are fully regenerated and a draw-off of demineralized water from the supply pipe 142 is effected, the beds 113 and 115 are degenerated by substantially equal amounts, whereby it is desirable that the rates of recovery or regeneration of the beds 113 and 115 should be equal in the time interval immediately following the draw-off of demineralized water from the pipe 142; and this can be accomplished by matching the regeneration or recovery rates of the beds 113 and 115 by varying the resistance therethrough for current passing between the anode and the cathode. Specifically, in order to achieve this objective, the resistance of the anion exchange resin bed 113 is preferably maintained substantially constant whereby to effect substantially constant regeneration thereof by utilizing a full cathode and anode area and by utilizing substantially equal bodies of anolyte and catholyte in contact therewith through the associated diaphragms 103 and 104. At the same time the resistance through the cation exchange resin bed 115 is varied and selectively alternately changed between a first constant regeneration rate substantially higher than the regeneration rate of the anion exchange resin bed 113 and a second lower regeneration rate which is substantially less than the regeneration rate of the anion exchange resin bed 113, whereby the total regeneration of the cation exchange resin bed 115 substantially matches that of the total regeneration of the anion exchange resin bed 113. The first regeneration rate of the cation exchange resin bed 115 is obtained by applying the full voltage between full cathodes and anodes and with the anolyte chamber 105 and the catholyte chamber 107 filled, this more specifically being accomplished by placing the valve 175 in the closed position and admitting catholyte into the chamber 107 until it overflows through the conduit 172. The second lower regeneration rate of the cation exchange resin bed 115 is obtained by opening the valve 175 whereby to lower the level of catholyte within the catholyte chamber 107 to a point in alignment with the conduit 173 thereby substantially removing the catholyte from contact with the cation exchange resin bed 115 and thus materially increasing the effective resistance between the anode 106 and the cathode 108 through the cation exchange resin bed 115.

The desired regeneration rate of the cation exchange resin bed 115 is electrically and automatically controlled by the pH controller 230 whereby the regeneration of the cation exchange resin bed 115 is maintained substantially equal to that of the anion exchange resin bed 113. More specifically, a desired range of pH of the water within the buffer tank 120 can be selected by means of the control member 231, this selection of the operating range balancing the Wheatstone bridge in the pH controller 230 to a condition such that when the desired pH, for example pH 7, is selected, the contact arm 244 is positioned angularly equidistantly between the contacts 245 and 246. If the pH within the buffer tank 120 rises, the bridge will become unbalanced because of the change in resistance between the probes 181 and 182 within the buffer tank 120 and this will cause the torque motor 240 to operate to move the contact arm 244 toward the contact 245. If the pH rises to an undesirably high value, the arm 244 is moved across the contact 245 whereby to operate the valve 145 and prevent withdrawal of water from the system 100 while the pH of the water within the system is at an undesirably high value. The normal greater capacity of the cation exchange resin bed 115 will thereafter correct the pH of the water within the buffer tank 120 whereby to cause operation of the torque motor 240 in a clockwise direction and thus open the valve 145.

If the pH falls below the pre-selected operating value, the contact arm 244 will be moved against the contacts 246 and 247 whereby to close the valve 145 and to open the valve 175 whereby to lower the level of the catholyte within the catholyte chamber 107 to a level with the conduit 173. This will substantially increase the resistance between the anode 106 and the cathode 108 through the cation exchange resin bed 115 whereby to pass a smaller number of coulombs therethrough and thus obtain a substantially lesser regeneration rate thereof. Accordingly, the pH within the system 100 will begin to rise since anions will be preferentially removed from the water and replaced with hydroxyl ions thus raising the pH. When the pH attains a satisfactory and usable value, the contact arm 244 will be moved away from the contacts 246 and 247 thus opening the valve 145 to permit withdrawal of demineralized water from the system 100 and to close the valve 175 whereupon subsequent closure of the switch 218 by the timer motor 212 will add additional catholyte to the catholyte chamber 107 thus decreasing the resistance through the cation exchange resin bed 115 and thus attaining the first or higher regeneration rate thereof.

In the system 100 the effective resistance through the cation exchange resin bed 115 is changed and increased by lowering the level of the catholyte in the catholyte chamber 107 whereby substantially to remove all catholyte from contact with the cation exchange resin bed 115 through the diaphragm 104; however, it will be appreciated that other methods of and apparatus for increasing the effective resistance between the anode 106 and the cathode 108 through the cation exchange resin bed 115 may be employed in an obvious manner.

Recapitulating: in the system of the present invention, the water to be demineralized is first introduced into a buffer tank containing previously demineralized water so that it is substantially diluted; and the resulting mixed water is circulated in a local loop circuit from the buffer tank to a cation exchange resin bed and an anion exchange resin bed and back to the buffer tank. The cation exchange resin bed and the anion exchange resin bed are regenerated by like amounts at equal average rates; more specifically, the anion exchange resin bed is regenerated at a predetermined rate and the cation exchange resin bed is alternately regenerated at a rate relatively higher than the predetermined rate of the anion exchange resin bed and at a rate relatively lower than the predetermined rate of the anion exchange resin bed so that the total regeneration of the anion exchange resin bed substantially matches the total regeneration of the cation exchange resin bed. The control of the regeneration rate of the cation exchange resin bed is accomplished by increasing the effective resistance through the bed which is in turn accomplished by removing the catholyte in contact therewith.

In view of the foregoing, it is apparent that there has been provided an improved water demineralizing method and system involving both ion exchange and electrodialysis, wherein the recovery or regeneration rates of the anion exchange resin bed and the cation exchange resin bed are substantially matched, so that the states of charge or regeneration of the two beds are always substantially matched in the operation of the system.

While there has been described what is at present considered to be certain preferred embodiments of the invention, it will be understood that various modifications may be made therein, and it is intended to cover in the appended claims all such modifications as fall within the true spirit and scope of the invention.

What is claimed is:

1. The method of demineralizing raw water containing dissolved metal salts, comprising passing the raw water through a first bed of cation exchange resin and then through a second bed of anion exchange resin that are separate and distinct with respect to each other and both contained in an inner compartment of an electrolytic cell and separated by a first ion permeable membrane from a body of anolyte and separated by a second ion permeable membrane from a body of catholyte, whereby the raw water is demineralized with corresponding degeneration of the resins in said beds, regenerating electrically at a first rate the anion exchange resin in said second bed, and selectively regenerating electrically respectively at second and third rates the cation exchange resin in said first bed, wherein said second and third rates are respectively higher and lower than said first rate and are productive of an average rate that is substantially equal to said first rate, said regeneration of the anion exchnge resin in said second bed being produced by the electrolytic displacement of sorbed anions therefrom through said first membrane into said body of anolyte and said regeneration of the cation exchange resin in said first bed being produced by the electrolytic displacement of sorbed cations therefrom through said second membrane into said body of catholyte.

2. The method of demineralizing raw water containing dissolved metal salts, which comprises passing the raw water through a first bed of cation exchange resin and then through a second bed of anion exchange resin that are separate and distinct with respect to each other and both contained in an inner compartment of an electrolytic cell and separated by a first ion permeable membrane from a body of anolyte having an anode therein and separated by a second ion permeable membrane from a body of catholyte having a cathode therein, whereby the raw water is demineralized with the corresponding degeneration of the resins in said beds, applying an electrical potential between said anode and said cathode and across said beds in parallel relation so as to cause separate electrolytic displacement of sorbed anions from the anion exchange ion in said second bed through said first membrane into said body of anolyte and of sorbed cations from the cation exchange resin in said first bed through said second membrane into said body of catholyte, thereby to effect electrical regeneration of the anion exchange resin in said second bed and of the cation exchange resin in said first bed, and selectively varying the electrical resistance through said first bed between said anode and said cathode so as selectively to vary the rate at which the cation exchange resin in said first bed is electrically regenerated.

3. The method set forth in claim 2, wherein the electrical resistance through said first bed between said anode and said cathode is varied by selectively varying the area of the cation exchange resin in said first bed that is in close proximity to said body of catholyte.

4. The method of demineralizing raw water containing dissolved metal salts, which comprises passing the raw water through a first bed of cation exchange resin and then through a second bed of anion exchange resin that are separate and distinct with respect to each other and both contained in an inner compartment of an electrolytic cell and separated by a first ion permeable membrane from a body of anolyte having an anode therein and separated by a second ion permeable membrane from a body of catholyte having a cathode therein, whereby the raw water is demineralized with the corresponding degeneration of the resins in said beds, applying an electrical potential between said anode and said cathode and across said beds in parallel relation so as to cause separate electrolytic displacement of sorbed anions from the anion exchange resin in said second bed through said first membrane into said body of anolyte and of sorbed cations from the cation exchange resin in said first bed through said second membrane into said body of catholyte, thereby to effect electrical regeneration of the anion exchange resin in said second bed and of the cation exchange resin in said first bed, and selectively varying in response to the ion concentration in the demineralized water from said second chamber the electrical resistance through said first bed between said anode and said cathode so as selectively to vary the rate at which the cation exchange resin in said first bed is electrically regenerated.

5. Apparatus for demineralizing raw water containing dissolved metal salts, comprising an electrolytic cell having first and second and third chambers, a first ion permeable membrane disposed as a common wall between said first and second chambers, a second ion permeable membrane disposed as a common wall between said second and third chambers, a first bed of cation exchange resin and a second bed of anion exchange resin both disposed in said second chamber, said beds being separate and distinct with respect to each other, means for passing the raw water through said second chamber and into contact with said beds and also into contact with said membranes so as to effect demineralization thereof, said first chamber being adapted to contain a body of anolyte therein in contact with said first membrane and said third chamber being adapted to contain a body of catholyte therein in contact with said second membrane, means for regenerating electrically at a first rate the anion exchange resin in said second bed, and means controlled by the pH of the demineralized water from said second chamber for selectively regenerating electrically respectively at second and third rates the cation exchange resin in said first bed, wherein said second and third rates are respectively higher and lower than said first rate and are productive of an average rate that is substantially equal to said first rate, said regeneration of the anion exchange resin in said second bed being produced by the electrolytic displacement of sorbed anions therefrom through said first membrane into the anolyte in said first chamber and said regeneration of the cation exchange resin in said first bed being produced by the electrolytic displacement of sorbed cations therefrom through said second membrane into the catholyte in said third chamber.

6. Apparatus for demineralizing raw water containing dissolved metal salts, comprising an electrolytic cell having first and second and third chambers, a first ion permeable membrane disposed as a common wall between said first and second chambers, a second ion permeable membrane disposed as a common wall between said second and third chambers, a first bed of cation exchange resin and a second bed of anion exchange resin both disposed in said second chamber, said beds being separate and distinct with respect to each other, means for passing the raw water through said second chamber and into contact with said beds and also into contact with said membranes so as to effect demineralization thereof, an anode disposed in said first chamber, a cathode disposed in said third chamber, said first chamber being adapted to contain a body of anolyte therein in contact with said first membrane and said anode, said third chamber being adapted to contain a body of catholyte therein in contact with said second membrane and said cathode, means for applying an electrical potential between said anode and said cathode and across said beds in parallel relation so as to cause separate electrolytic displacement of sorbed anions from the anion exchange resin in said second bed through said first membrane into the anolyte in said first chamber and of sorbed cations from the cation exchange resin in said first bed through said second membrane into the catholyte in said third chamber, thereby to effect electrical regeneration of the anion exchange resin in said second bed and of the cation exchange resin in said first bed, and means for selectively varying the electrical resistance through said first bed between said anode and said cathode so as selectively to vary the rate at which the cation exchange resin in said first bed is electrically regenerated.

7. The apparatus set forth in claim 6, wherein said last-named means includes a device that is selectively operative to vary the area of the cation exchange resin in said first bed that is in close proximity to the catholyte in said third chamber.

8. Apparatus for demineralizing raw water containing dissolved metal salts, comprising an electrolytic cell having first and second and third chambers, a first ion permeable membrane disposed as a common wall between said first and second chambers, a second ion permeable membrane disposed as a common wall between said second and third chambers, a first bed of cation exchange resin and a second bed of anion exchange resin both disposed in said second chamber, said beds being separate and distinct with respect to each other, means for passing the raw water through said second chamber and into contact with said beds and also into contact with said membranes so as to effect demineralization thereof, an anode disposed in said first chamber, a cathode disposed in said third chamber, said first chamber being adapted to contain a body of anolyte therein in contact with said first membrane and said anode, said third chamber being adapted to contain a body of catholyte therein in contact with said second membrane and said cathode, means for applying an electrical potential between said anode and said cathode and across said beds in parallel relation so as to cause separate electrolytic displacement of sorbed anions from the anion exchange resin in said second bed through said first membrane into the anolyte in said first chamber and of sorbed cations from the cation exchange resin in said first bed through said second membrane into the catholyte in said third chamber, thereby to effect electrical regeneration of the anion exchange resin in said second bed and of the cation exchange resin in said first bed, and means responsive to the ion concentration in the demineralized water from said second chamber for selectively varying the electrical resistance through said first bed between said anode and said cathode so as selectively to vary the rate at which the cation exchange resin in said first bed is electrically regenerated.

9. Apparatus for demineralizing raw water containing dissolved metal salts, comprising an electrolytic cell having first and second and third chambers, a first ion permeable membrane disposed as a common wall between said first and second chambers, a second ion permeable membrane disposed as a common wall between said second and third chambers, a first bed of cation exchange resin and a second bed of anion exchange resin both disposed in said second chamber, said beds being separate and distinct with respect to each other, an inlet pipe adapted to contain raw water under pressure and connected to the inlet side of said second chamber, an outlet pipe adapted to contain demineralized water under pressure and connected to the outlet side of said second chamber, valve mechanism arranged in said outlet pipe, whereby upon opening of said valve mechanism demineralized water from said outlet pipe passes to the outside and raw water from said inlet pipe passes through said second chamber and into contact with said beds and also into contact with said membranes so as to effect demineralization thereof, an anode disposed in said first chamber, a cathode disposed in said third chamber, said first chamber being adapted to contain a body of anolyte therein in contact with said first membrane and said anode, said third chamber being adapted to contain a body of catholyte therein in contact with said second membrane and said cathode, means for applying an electrical potential between said anode and said cathode and across said beds in parallel relation so as to cause separate electrolytic displacement of sorbed anions from the anion exchange resin in said second bed through said first membrane into the anolyte in said first chamber and of sorbed cations from the cation exchange resin in said first bed through said second membrane into the catholyte in said third chamber, thereby to effect electrical regeneration of the anion exchange resin in said second bed and of the cation exchange resin in said first bed, and means controlled by the pH of the demineralized water from said second chamber and responsive to a given departure of the pH thereof from a predetermined value for closing said outlet pipe against the passage of water therefrom to the outside.

10. Apparatus for demineralizing raw water containing dissolved metal salts, comprising an electrolytic cell having first and second and third chambers, a first ion permeable membrane disposed as a common wall between said first and second chambers, a second ion permeable membrane disposed as a common wall between said second and third chambers, a first bed of cation exchange resin disposed in the upper portion of said second chamber and a second bed of anion exchange resin disposed in the lower portion of said second chamber, an inlet pipe adapted to contain raw water under pressure and connected to the inlet side of said second chamber, an outlet pipe adapted to contain demineralized water under pressure and connected to the outlet side of said second chamber, valve mechanism in said outlet pipe, whereby upon opening of said valve mechanism demineralized water from said outlet pipe passes to the outside and raw water from said inlet pipe passes through said second chamber and into contact with said beds and also into contact with said membranes so as to effect demineralization thereof, an anode disposed in said first chamber, a cathode disposed in said third chamber, said first chamber being adapted to contain a body of anolyte therein in contact with said first membrane and said anode, said third chamber being adapted to contain a body of catholyte therein in contact with said second membrane and said cathode, a device for controlling the level of the catholyte in said third chamber, a high level of the catholyte in said third chamber being disposed adjacent to the upper portion of said first bed and a low level of the catholyte in said third chamber being disposed adjacent to the upper portion of said second bed, means for applying an electrical potential between said anode and said cathode and across said beds in parallel relation so as to cause separate electrolytic displacement of sorbed anions from the anion exchange resin in said second bed through said first membrane into the anolyte in said first chamber and of sorbed cations from the cation exchange resin in said first bed through said second membrane into the catholyte in said third chamber, thereby to effect electrical regeneration of the anion exchange resin in said second bed and of the cation exchange resin in said first bed, and means responsive to the pH of the demineralized water from said second chamber for selectively controlling said device, said last-named means being responsive to a high pH of the demineralized water mentioned for controlling said device to establish a high level of the catholyte in said third chamber and responsive to a low pH of the demineralized water mentioned for controlling said device to establish a low level of the catholyte in said third chamber, whereby a high level of the catholyte in said third chamber establishes a high rate of electrical regeneration of the cation exchange resin in said first bed and a low level of the catholyte in said third chamber establishes a low rate of electrical regeneration of the cation exchange resin in said first bed.

11. The apparatus set forth in claim 10, wherein said device comprises a conduit communicating with said third chamber at a point between the upper and lower portions thereof, and a control valve in said conduit, whereby upon opening of said control valve catholyte passes from said hird chamber through said conduit to establish a low level of the catholyte in said third chamber.

12. Apparatus for demineralizing raw water containing dissolved metal salts, comprising an electrolytic cell having first and second and third chambers, a first ion permeable membrane disposed as a common wall between said first and second chambers, a second ion permeable membrane disposed as a common wall between said second and third chambers, a first bed of cation exchange resin disposed in the upper portion of said second chamber and a second bed of anion exchange resin disposed in the lower portion of said second chamber, an anode disposed in said first chamber, a cathode disposed in said third chamber, said first chamber being adapted to contain a body of anolyte therein in contact with said first membrane and said anode, said third chamber being adapted to contain a body of catholyte therein in contact with said second membrane and said cathode, a buffer tank, conduit means completing a closed series loop circuit from said buffer tank to said second chamber and thence back to said buffer tank, an inlet pipe adapted to contain raw water under pressure and connected to the inlet of said buffer tank, an outlet pipe adapted to contain demineralized water under pressure and connected to said loop circuit on the outlet side thereof, valve mechanism arranged in said outlet pipe, whereby opening of said valve mechanism effects the supply of demineralized water from said outlet pipe to the outside and effects the supply of raw water from said inlet pipe to said buffer tank and therefrom to said second chamber, pump means for effecting local circulation of water in said loop circuit from said buffer tank through said second chamber and back to said buffer tank, whereby the circulated water is demineralized by said beds in said second chamber with the resulting degeneration thereof, means for applying an electrical potential between said anode and said cathode and across said beds in parallel relation so as to cause separate electrolytic displacement of sorbed anions from the anion exchange resin in said second bed through said first membrane into the anolyte in said first chamber and of sorbed cations from the cation exchange resin in said first bed through said second membrane into the catholyte in said third chamber, thereby to effect electrical regeneration of the anion exchange resin in said second bed and of the cation exchange resin in said first bed, and means controlled by the pH of the demineralized water from said second chamber for selectively varying the electrical resistance through said first bed between said anode and said cathode so as selectively to vary the rate at which the cation exchange resin in said first bed is electrically regenerated.

13. The apparatus set forth in claim 12, wherein said last-mentioned means includes electrodes arranged in said buffer tank and is thus responsive to the pH of the demineralized water in said buffer tank.

14. The apparatus set forth in claim 12, and further comprising additional means responsive to the pH of the demineralized water from said second chamber for selectively controlling said valve mechanism, said additional means being responsive to a pH of the demineralized water that is disposed either above or below a predetermined value for operating said valve mechanism into its closed position.

References Cited in the file of this patent

UNITED STATES PATENTS

| | | |
|---|---|---|
| 1,956,741 | Hornberger | May 1, 1934 |
| 2,058,761 | Beckman | Oct. 27, 1936 |
| 2,607,718 | Suthard | Aug. 19, 1952 |
| 2,825,666 | Stoddard | Mar. 4, 1958 |
| 2,906,684 | Stoddard | Sept. 28, 1959 |
| 2,980,598 | Stoddard | Apr. 18, 1961 |

FOREIGN PATENTS

| | | |
|---|---|---|
| 675,253 | Great Britain | July 9, 1952 |
| 702,316 | Great Britain | Jan. 13, 1954 |